United States Patent [19]

Blake

[11] Patent Number: 5,922,225

[45] Date of Patent: Jul. 13, 1999

[54] APPARATUS FOR REDUCING VAPORIZED MATERIAL DEPOSITS DURING LASER CUTTING

[76] Inventor: Ronald J. Blake, 3420 S. Brady Ct., Sheridan, Colo. 80209

[21] Appl. No.: 08/810,023

[22] Filed: Mar. 4, 1997

Related U.S. Application Data

[60] Provisional application No. 60/012,906, Mar. 6, 1996.

[51] Int. Cl.⁶ .................................................. B23K 26/14
[52] U.S. Cl. ............................... 219/121.84; 219/121.67; 219/121.82
[58] Field of Search ......................... 219/121.84, 121.82, 219/121.67; 428/116; 269/20, 21, 54.5; 33/340, 573; 83/941; 409/220

[56] References Cited

U.S. PATENT DOCUMENTS

| | | | |
|---|---|---|---|
| 3,004,766 | 10/1961 | Bryant | 269/21 |
| 4,112,797 | 9/1978 | Pearl | 83/941 |
| 4,528,878 | 7/1985 | Gerber | 83/941 |
| 4,936,722 | 6/1990 | Schwinn | 409/220 |
| 5,158,272 | 10/1992 | Biervert et al. | 269/21 |
| 5,222,719 | 6/1993 | Effner | 269/21 |
| 5,227,606 | 7/1993 | Weeks et al. | 219/121.84 |
| 5,288,061 | 2/1994 | Pieroni | 269/54.5 |
| 5,632,915 | 5/1997 | Schnetzer et al. | 219/121.84 |

Primary Examiner—Geoffrey S. Evans
Attorney, Agent, or Firm—Edwin H. Crabtree; Ramon L. Pizavvo; Donald W. Margolis

[57] ABSTRACT

A work sheet support apparatus for greatly reducing and/or eliminating vaporized waste material deposits on a tooling plate during laser cutting of a work piece from various types of thin sheet material. The support apparatus allows for air flow in and around a newly cut surface in the work sheet. The air flow helps condense the vaporized material cut by a laser beam onto the sides of a plurality of holes in the support apparatus and preventing the waste material from depositing on the tooling plate. The apparatus includes a frame with one side having a scale corresponding to a "X" axis and an adjacent side having a scale corresponding to a "Y" axis. The support apparatus further includes a perforated housing, such as a honeycomb structure, having a plurality of holes therethrough for allowing air circulation in and around a newly cut surface of the work piece. The apparatus also includes legs on the bottom of corners of the frame for holding the apparatus above a flat surface of the tooling plate. The tooling plate is received on top of a work bench which can be raised and lowered vertically. Disposed on one side of the apparatus is an air stream discharge duct for circulating fresh air above and below the support apparatus. On an opposite side of the apparatus is a vacuum duct for receiving the circulated air along with air entrained particles from the laser cutting operation.

10 Claims, 1 Drawing Sheet

APPARATUS FOR REDUCING VAPORIZED MATERIAL DEPOSITS DURING LASER CUTTING

This application claims the benefits of a provisional application filed in the U.S. Patent and Trademark Office on Mar. 6, 1996, Ser. No. 60/012,906 and having a title of "APPARATUS FOR REDUCING VAPORIZED MATERIAL DEPOSITS DURING LASER CUTTING" by the subject inventor.

BACKGROUND OF THE INVENTION (a) Field of the Invention

This invention relates to machine tooling used in laser cutting and engraving of various types of work pieces and more particularly, but not by way of limitation, to a work sheet apparatus for preventing the deposition of condensed waste material on a tooling plate.

(b) Discussion of Prior Art

Heretofore in the laser cutting of sheet material such as plastic, wood, rubber and like material, the sheet material has been supported on top of a flat tooling plate. As the sheet material is cut into various types of work pieces, the waste material from the cut is vaporized and then condenses on the sides of the cut material and onto the surface of the tooling plate. When the cutting operation is completed, the work pieces are removed from the tooling plate and the top surface of the tooling plate has to be cleaned prior to being used in another cutting procedure. Also, the waste material that condenses on the sides of the work piece can cause uneven surfaces and an unacceptable work product.

The subject invention eliminates the above mentioned problems related to unwanted deposits of waste material during the laser cutting of work pieces while greatly improving the efficiency of the cutting operation.

SUMMARY OF THE INVENTION

In view of the foregoing, it is an object of the present invention to greatly reduce if not eliminate the deposition of waste material on a tooling plate mounted on a work table during the laser cutting of various types of this sheet material.

Another object of the invention is to allow for circulation of air in and around a freshly cut surface to help condense the vaporized waste material onto the sides of holes in the work sheet support apparatus. Also by circulating air in and around the cut surface, deposition on the sides of the cut surface is reduced thereby providing an improvement in the quality of the work piece.

Yet another object of the new work sheet support apparatus is by reducing and/or eliminating deposit of waste material on the tooling plate the overall efficiency of the cutting operation is improved with increased production, reduced laser down time, enhanced cut appearance, reduced maintenance and lower cost per unit cut.

The work sheet support apparatus includes a frame with one side having a scale corresponding to a "X" axis and an adjacent side having a scale corresponding to a "Y" axis. The two axis are used to help establish a two dimensional plane for moving the laser which is under computer control. The support apparatus further includes a perforated housing, such as a honeycomb structure, having a plurality of holes therethrough for allowing air circulation in and around a newly cut surface of the work piece. The support apparatus also includes legs on the bottom of corners of the frame for holding the apparatus above a flat surface of the tooling plate. The tooling plate is received on top of a work table which can be raised and lowered vertically along a "Z" axis. Disposed on one side of the support apparatus is an air stream discharge duct for circulating fresh air above and below the support apparatus. On an opposite side of the support apparatus in a vacuum duct for receiving the circulated air along with smoke and air entrained particles from the laser cutting operation.

These and other objects of the present invention will become apparent to those familiar with the use of lasers in cutting and engraving sheet material for making various types and configurations of work pieces and other applications when reviewing the following detailed description, showing novel construction, combination, and elements as herein described, and more particularly defined by the appended claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
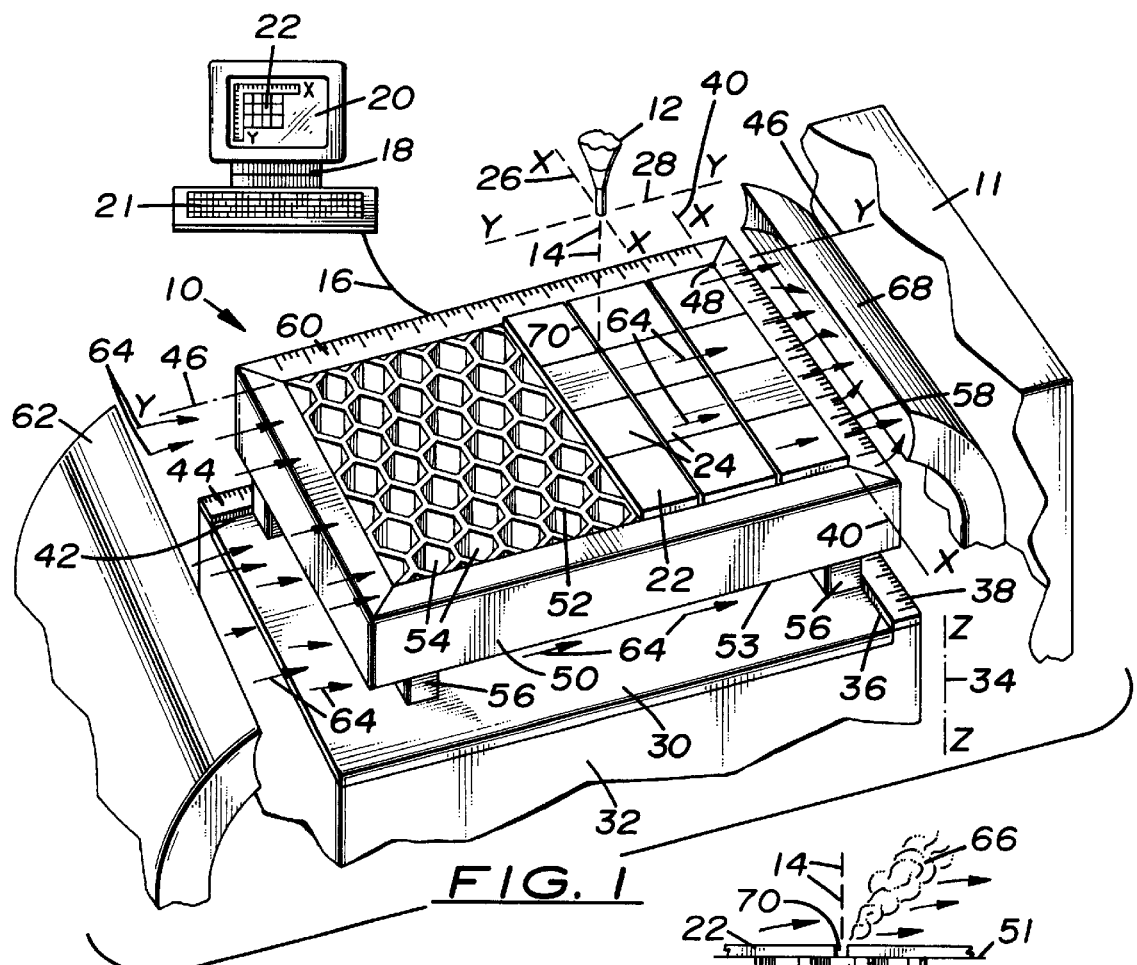
FIG. 1 is a perspective view of the subject work sheet support apparatus removably mounted on top of a tooling plate attached to a work table. A portion of a laser is shown disposed above a recently cut work piece. The laser is under computer control.

In FIG. 1, the subject work sheet support apparatus is designated by general reference numeral 10. The apparatus 10 is used with a laser 12 having a laser beam 14 shown in dotted lines. The laser 12 is part of a laser cutting and engraving system received in a system housing 11 which has been cut away to exposed the subject invention. The laser 12 is electrically connected via lead 16 to a computer 18 having a viewing screen 20 with key board 21 used to program the movement of the laser 12 in cutting or engraving work pieces in various configurations produced from sheets of paper, plastic film, leather, rubber, fabric, vinyl and like materials. A sheet material 22 is shown in the drawings being cut into a plurality of square work pieces 24. The computer 20 is used to guide the laser 12 in an "X" axis 26 shown in dotted lines and in a "Y" axis 28 shown in dotted lines. Note the viewing screen 20 shows a duplication of the sheet material 22 lined up along an "X" axis and "Y" axis on the screen.

Heretofore, the sheet material 22 was placed on top of tooling plate 30 mounted on top of a work bench 32 which is adjustable vertically along a "Z" axis shown as line 34. By raising and lowering the work bench 32 along the "Z" axis, the laser beam 14 can be focused on the sheet material 22. When the sheet material 22 is cut on top of the tooling plate 30 there is no means for circulating air under the sheet material 22 and in and around the freshly cut material. Therefore, the waste material cut, which is vaporized by the laser beam 14, condenses on the sides of the completed work pieces 24 and on the tooling plate 30. Quite often the work pieces are degraded because of the waste material that has accumulated along the bottom side of the work pieces 24. Also, the tooling plate 30 required cleaning before another cutting operation can be started.

Along one side 36 of the tooling plate 30 is a raised measurement scale 38. The scale 38 is disposed along an "X" axis shown as a solid line 40. Along another side 42 of the tooling plate 30 is a raised measurement scale 44. The scale 44 is disposed along a "Y" axis shown as a solid line 46. The "X" axis 40 intersects the "Y" axis 46 at a point 48 which is a "zero" coordinate for a two dimensional plane established by the "X" axis 40 and the "Y" axis 46. The zero point 48 is not seen in FIG. 1 on the tooling plate 22 but is shown on the apparatus 10. The scales 38 and 44 may be inches, millimeters and any other desired measurement.

Referring now to the subject work sheet support apparatus 10, the apparatus 10 includes an angular frame 50 for receiving and holding a removable perforated housing 52 having a top surface 51 and a bottom surface 53 with a plurality of vertical holes 54 extending downwardly from the top surface 51 to the bottom surface 53. The bottom surface 53 can be seen in FIG. 2. The perforated housing 52 is removable from the frame 50 for washing, cleaning and removing the vaporized waste material that is deposited therein.

The perforated housing 52 may be in the form of a honeycomb structure, a corrugated structure, or any other type of structure having spaced openings therethrough. Also the perforated housing may be made of different types of metals, fire retardant paper materials and similar material that prevents a reflection off of the laser beam 14. The frame 50 includes legs 56 for holding the housing 52 above the top of the tooling plate 30. The legs 56 are offset inwardly on the bottom of the frame 50 to allow a measurement scaled side 58 of the frame 50 to be automatically indexed directly above the scale 38 next to the tooling plate 30. The scaled side 58 is along the "X" axis 40 and corresponds with the scale 38 for programming purposes on the computer 18. Likewise, the frame 50 includes a measurement scaled side 60 indexed directly above the scale 44. The scaled side 60 is along the "Y" axis 46 and corresponds with the scale 44 for programming purposes on the computer 18. The zero point 48 on the frame 50 is directly above and corresponds with the same point 48 on the tooling plate 30. The scaled sides 58 and 60 are raised above the top surface 51 of the perforated housing 52 for placing the sides of the sheet material thereagainst.

As mentioned above, FIG. 1 illustrates the laser beam 14 cutting the sheet material 22 into square shaped work pieces 24. Both the sheet material 22 and the work pieces 24 are supported on the top surface 51 of the perforated housing 52 rather than on top of the tooling plate 30. Also a corner of the sheet material 22 is disposed at the zero point 48 with adjacent sides of the sheet material 22 aligned along the scaled sides 58 and 60. In this manner, the sheet material 22 corresponds with the illustration seen on the screen 20 for duplicating the cutting of the work pieces 24 as programmed.

Disposed on left side of the support apparatus 10 is an air discharge duct 62 for circulating air, shown as arrows 64, above and below the top and bottom surfaces 51 and 53 of the perforated housing 52. The air 64 is circulated from left to right for moving vaporized material 66 (shown as a smoke like substance) from the laser cutting and including any air entrained particles into a vacuum duct 68.

Figure 2:
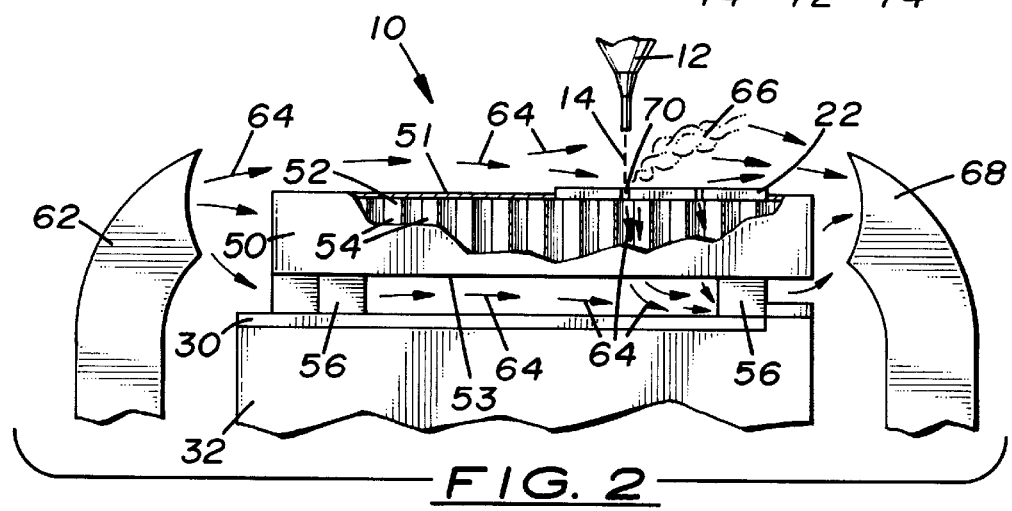
FIG. 2 illustrates a side view of the work sheet support apparatus with a portion of a frame and perforated housing cut away to expose air flow above and below the housing and work sheet along with air flow drawn through perforations in the housing for condensing the vaporized waste material.

In FIG. 2, a side view of the work sheet support apparatus 10 is shown received on top of the tooling plate 30. Also a portion of the frame 50 has been cut away to expose the holes 54 in the perforated housing 52. In this view, the laser beam 14 is shown making a cut 70 along a portion of the sheet material 22 with the vaporized waste material 66 from the cut 70 being drawn by the air 64 into the vacuum duct 68. At the same time, air 64 is drawn downwardly through the cut 70 into one or more holes 54. Air 64 which is circulated underneath the bottom surface 53 of the housing 52 acts as a venturi in drawing the air 64 flowing above the top surface 51 of the housing 52 downwardly into the holes 54. When the cutting operation is in progress, the laser beam 14 vaporizes the waste material cut. As this waste material moves downwardly in one or more holes 54, the circulated air cools and condenses the waste material into deposits 72. The deposits 72 can be seen more clearly disposed along a length of opposite sides 74 of a hole 54 shown in FIG. 3.

To enhance the holding down of the sheet material 22 and work pieces 24 on top of the housing 52, air 64 can be directed from the duct 62 only onto the top of the housing 52 and not underneath the housing 52 as shown in FIGS. 1 and 2. This can be accomplished by blocking off the lower portion of the sides of the angular frame 50 next to the duct 62 and the opposite sides of the frame 50 parallel to the "Y" axis from the bottom surface 53 down to the top of the tooling plate 30. When the three sides of the frame 50 are blocked off, the lower side of the frame 50 between the legs 56 and next to the vacuum duct 68 is left open. This feature greatly improves the draw of vacuum of the air 64 circulated from the top of the housing 52 and downwardly through the individual holes 54 and helps in tightly holding down the sheet material 22 on top of the housing 52, should the sheet material 22 be light weight or warped. The feature of blocking off the air flow underneath the three sides of the housing is not shown in the drawings.

Figure 3:
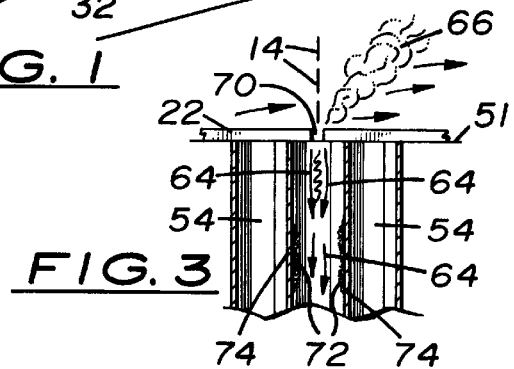
FIG. 3 is an enlarged view of the portion of the work sheet and the perforated housing for illustrating in greater detail the air flow through the perforations and the deposition of the waste material along the sides of the perforations.

Referring now to both FIGS. 2 and 3, as the air 64 moves downwardly along the length of the holes 54 of the perforated housing 52, the waste material is condensed and deposited along the length of the sides 74 of the holes 54 which are positioned below the cuts being made in the sheet material 22 creating the work pieces 22. When the air 64, which has helped condense the waste material, reaches the bottom surface 53 of the perforated housing 52 the air is drawn from left to right as shown in FIG. 2 and is sucked into the vacuum duct 68. In this manner, vaporized waste material from the cut 70 is prevented from being deposited on top of the tooling plate 30 with the advantages as discussed above.

In the above described drawing, the apparatus 10 has been described with the frame 50 and perforated housing 52 disposed on top of the tooling plate 30 of the workbench 32. In the alternative, the perforated housing 52 could be incorporated into the top of the workbench 32 with the top surface of the housing 52 as the same elevation as the tooling plate 30. In this example, the air 64 would be introduce next to the top of the workbench 32 and the vacuum duct 68 incorporated into the side of the workbench32 for drawing a vacuum similar to the vacuum drawn as shown in the drawings.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A work sheet support apparatus for greatly reducing and eliminating vaporized waste material deposits on a flat surface of a tooling plate during laser cutting of a work piece from various types of thin sheet material, the tooling plate having one side with a measurement scale corresponding to an X axis and an adjacent perpendicular side corresponding to a Y axis, the work sheet support apparatus allows for air flow above the top of the support apparatus and in and around a newly cut surface in the work sheet, the air flow helps condense the vaporized waste material cut by a laser beam, the support apparatus comprising:

an angular shaped frame having a first side with a measurement scale corresponding to a X axis and having an adjacent perpendicular second side with a measurement scale corresponding to a Y axis, the X axis and Y axis adapted for use in establishing a two dimensional coordinate system on the sheet material for guiding the laser;

a perforated housing removably mounted in said frame, said perforated housing having a top surface and a bottom surface with a plurality of holes extending downwardly from the top surface to the bottom surface, said perforated housing adapted for allowing air circulation in and around a newly cut surface of the work piece received on the top surface of said perforated housing; and legs attached to the bottom of said frame adapted for holding the apparatus above the flat surface of the tooling plate and allowing air flow underneath the bottom surface of said perforated housing, the air flow underneath said perforated housing acting as a venturi in drawing air downwardly through the holes in said perforated housing, the legs offset inwardly on the bottom of said frame so that the first and second sides of said frame can be automatically indexed above the X axis measurement scale and the Y measurement scale of the tooling plate.

2. The support apparatus as described in claim 1 wherein said perforated housing is in the form of a honeycomb structure.

3. The support apparatus as described in claim 1 wherein said perforated housing is in the form of a corrugated structure.

4. The support apparatus as described in claim 1 wherein the first and second sides of said frame are raised above the top surface of the perforated housing for receiving sides of the sheet material thereagainst and aligning the sheet material in a two dimensional X and Y plane.

5. A work sheet support apparatus for greatly reducing and eliminating vaporized waste material deposits on a flat surface of a tooling plate during laser cutting of a work piece from various types of thin sheet material, the work sheet support apparatus allows for air flow above the top of the support apparatus and in and around a newly cut surface in the work sheet, the air flow helps condense the vaporized waste material cut by a laser beam, the support apparatus comprising:

an angular shaped frame having a first side and a second side, the second side perpendicular to the first side;

a perforated housing received in said frame, said perforated housing having a top surface and a bottom surface with a plurality of holes extending downwardly from the top surface to the bottom surface, said perforated housing adapted for allowing air circulation in and around a newly cut surface of the work piece received on the top surface of said perforated housing, said perforated housing removably mounted in said frame for allowing the cleaning of said perforated housing; and legs attached to the bottom of corners of said frame adapted for holding the apparatus above the flat surface of the tooling plate and allowing air flow underneath the bottom surface of said perforated housing, the air flow underneath said perforated housing acting as a venturi in drawing air downwardly through the holes in said perforated housing.

6. The support apparatus as described in claim 5 wherein said frame includes a scale corresponding to a X axis on the first side and the scale corresponding to a Y axis on the second side, the X axis and Y axis used to establish a two dimensional coordinate system on the sheet material for guiding the laser.

7. The support apparatus as described in claim 5 wherein the first and second sides of said frame are raised above the top surface of the perforated housing for receiving sides of the sheet material thereagainst and aligning the sheet material in a two dimensional X and Y plane.

8. The support apparatus as described in claim 5 wherein said angular shaped frame is adapted for receipt in an opening in a top of the work bench.

9. The support apparatus as described in claim 5 wherein said perforated housing is in the form of a honeycomb structure.

10. The support apparatus as described in claim 5 wherein said perforated housing is in the form of a corrugated structure.

* * * * *